(12) United States Patent
Evans et al.

(10) Patent No.: US 12,110,779 B2
(45) Date of Patent: Oct. 8, 2024

(54) DOWNHOLE SENSOR APPARATUS AND RELATED SYSTEMS, APPARATUS, AND METHODS

(71) Applicant: Baker Hughes Oilfield Operations LLC, Houston, TX (US)

(72) Inventors: Kenneth R. Evans, Spring, TX (US); Jeremy Todd Townsend, The Woodlands, TX (US); Jason Habernal, Magnolia, TX (US); Juan Miguel Bilen, The Woodlands, TX (US); Cecil Schandorf, Cypress, TX (US); Chaitanya K. Vempati, Conroe, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 210 days.

(21) Appl. No.: 16/945,428

(22) Filed: Jul. 31, 2020

(65) Prior Publication Data
US 2022/0034218 A1 Feb. 3, 2022

(51) Int. Cl.
*E21B 47/13* (2012.01)
*E21B 47/01* (2012.01)
(Continued)

(52) U.S. Cl.
CPC .............. *E21B 47/01* (2013.01); *E21B 47/13* (2020.05); *G01P 3/44* (2013.01); *G01P 15/00* (2013.01)

(58) Field of Classification Search
CPC ........ E21B 47/01; E21B 47/13; E21B 47/013; G01P 3/44; G01P 15/00
See application file for complete search history.

(56) References Cited

U.S. PATENT DOCUMENTS

| | | | |
|---|---|---|---|
| 4,754,639 A * | 7/1988 | Rich | G01N 9/04 |
| | | | 210/90 |
| 4,809,778 A * | 3/1989 | Johnson | E21B 27/02 |
| | | | 166/162 |

(Continued)

FOREIGN PATENT DOCUMENTS

| EP | 1253285 B1 | 9/2010 |
|---|---|---|
| EP | 3341564 B1 | 10/2019 |

(Continued)

OTHER PUBLICATIONS

International Search Report for International Application No. PCT/US2021/042508 dated Nov. 9, 2021, 4 pages.

(Continued)

*Primary Examiner* — Tarun Sinha
*Assistant Examiner* — James I Burris
(74) *Attorney, Agent, or Firm* — TraskBritt

(57) ABSTRACT

A downhole sensor apparatus may include a structure securing a circuit board. The structure may be configured to be inserted into a recess in a tool on a drill string. The downhole sensor apparatus may include one or more sensors coupled to the circuit board and a cap over the structure. The downhole sensor apparatus may further include a data port electrically coupled to the circuit board and configured to transmit data from the sensors to an external device. The downhole sensor apparatus may include a threaded element configured to thread into complementary threads in the recess in the tool. The downhole sensor apparatus may be configured to operate in an idle condition. The downhole sensor apparatus may compare readings from at least two sensors to threshold downhole conditions and begin normal operation when the readings from the at least two sensors meet or exceed the threshold downhole conditions.

20 Claims, 8 Drawing Sheets

(51) Int. Cl.
*G01P 3/44* (2006.01)
*G01P 15/00* (2006.01)

(56) References Cited

U.S. PATENT DOCUMENTS

| | | | |
|---|---|---|---|
| 4,823,116 A * | 4/1989 | Kitchen, III | G01M 3/045 73/40 |
| 6,347,282 B2 | 2/2002 | Estes et al. | |
| 6,484,589 B1 | 11/2002 | Brock | |
| 6,859,751 B2 | 2/2005 | Cardarelli | |
| 6,892,812 B2 | 5/2005 | Niedermayr et al. | |
| 6,895,678 B2 | 5/2005 | Ash et al. | |
| 6,945,330 B2 | 9/2005 | Wilson et al. | |
| 7,134,334 B2 | 11/2006 | Schirmer et al. | |
| 7,152,680 B2 | 12/2006 | Wilson et al. | |
| 7,363,717 B2 | 4/2008 | Ekseth et al. | |
| 7,644,760 B2 | 1/2010 | Woloson | |
| 7,685,732 B2 | 3/2010 | Davies et al. | |
| 7,886,845 B2 | 2/2011 | King et al. | |
| 8,024,980 B2 | 9/2011 | Arms et al. | |
| 8,489,333 B2 | 7/2013 | Bonavides et al. | |
| 9,518,849 B2 | 12/2016 | Lee et al. | |
| 10,006,280 B2 | 6/2018 | Logan et al. | |
| 10,036,241 B2 | 7/2018 | McGinnis et al. | |
| 10,280,735 B2 | 5/2019 | Finke et al. | |
| 11,619,123 B2 | 4/2023 | Dunbar | |
| 2006/0065395 A1 | 3/2006 | Snell | |
| 2015/0101865 A1 | 4/2015 | Mauldin et al. | |
| 2015/0330210 A1 | 11/2015 | Lozinsky | |
| 2017/0051578 A1 * | 2/2017 | Christie | G05B 15/02 |
| 2017/0204705 A1 | 7/2017 | King | |
| 2018/0066513 A1 * | 3/2018 | Sugiura | E21B 44/00 |
| 2018/0180418 A1 | 6/2018 | Estes et al. | |
| 2019/0169979 A1 | 6/2019 | Nguyen et al. | |
| 2019/0234781 A1 | 8/2019 | Mess et al. | |
| 2019/0345779 A1 | 11/2019 | Kennedy et al. | |
| 2019/0383132 A1 | 12/2019 | Laastad | |
| 2020/0011751 A1 | 1/2020 | Kazemi Miraki et al. | |
| 2020/0173776 A1 | 6/2020 | Hayes et al. | |
| 2022/0034223 A1 | 2/2022 | Evans et al. | |

FOREIGN PATENT DOCUMENTS

| | | |
|---|---|---|
| WO | 2007/014446 A1 | 2/2007 |
| WO | 2011/056263 A1 | 5/2011 |

OTHER PUBLICATIONS

International Written Opinion for International Application No. PCT/US2021/042508 dated Nov. 9, 2021, 5 pages.

* cited by examiner

DOWNHOLE SENSOR APPARATUS AND RELATED SYSTEMS, APPARATUS, AND METHODS

TECHNICAL FIELD

Embodiments of the present disclosure generally relate to earth-boring operations. In particular, embodiments of the present disclosure relate to downhole sensors, and related systems, apparatus, and methods.

BACKGROUND

Wellbore drilling operations may involve the use of an earth-boring tool at the end of a long string of pipe commonly referred to as a drill string. An earth-boring tool may be used for drilling through formations, such as rock, dirt, sand, tar, etc. In some cases, the earth-boring tool may be configured to drill through additional elements that may be present in a wellbore, such as cement, casings (e.g., a wellbore casing), discarded or lost equipment (e.g., fish, junk, etc.), packers, etc. In some cases, earth-boring tools may be configured to drill through plugs (e.g., fracturing plugs, bridge plugs, cement plugs, etc.). In some cases, the plugs may include slips or other types of anchors and the earth-boring tool may be configured to drill through the plug and any slip, anchor, and other component thereof.

The drill string and/or the earth-boring tool may include sensors configured to capture and/or store information acquired downhole. The downhole information may include environmental properties, such as downhole temperature, pressure, etc. In some cases, the downhole information may include operational measurements, such as weight on bit (WOB), rotational speed (RPM), fluid flow rates, etc. In some cases, the downhole information may include formation properties, such as lithology, porosity, strength, etc.

The downhole information may be collected and/or analyzed in real-time or at a later time. For example, the downhole information may be collected through a logging while drilling (LWD) or measuring while drilling (MWD) operation. The downhole information may enable an operator to make decisions, such as a type of earth-boring tool to use, operational decisions, tripping decisions, path decisions, etc. In some cases, the downhole information may be collected in a database configured to predict and/or model future earth-boring operations.

BRIEF SUMMARY

Some embodiments of the present disclosure may include a downhole sensor apparatus. The downhole sensor apparatus may include a structure securing a circuit board. The structure may be configured to be inserted into a recess in a tool on a drill string. The downhole sensor apparatus may further include one or more sensors coupled to the circuit board. The downhole sensor apparatus may also include a cap over the structure. The downhole sensor apparatus may further include a data port disposed through the cap. The data port may be electrically coupled to the circuit board and configured to transmit data from the one or more sensors to an external device. The downhole sensor apparatus may also include a threaded element configured to thread into complementary threads in the recess in the tool. The threaded element may be configured to secure the structure to the tool.

Another embodiment of the present disclosure may include an earth-boring tool. The earth-boring tool may include a recess in the earth-boring tool. The earth-boring tool may further include a sensor structure securing a circuit board. The sensor structure may be disposed in the recess in the earth-boring tool. The earth-boring tool may also include one or more sensors coupled to the circuit board. The earth-boring tool may further include a data transfer device electrically coupled to the circuit board. The data transfer device may be configured to transmit data from the one or more sensors to an external device. The earth-boring tool may also include a cap over the sensor structure. The sensor structure may be positioned between the cap and the earth-boring tool. The earth-boring tool may further include a threaded element configured to secure the cap to the earth-boring tool.

Another embodiment of the present disclosure may include a method of controlling a sensor apparatus on a downhole tool. The method may include operating the sensor apparatus in an idle condition. The method may further include capturing readings from at least two sensors at a time interval. The method may also include comparing the readings from the at least two sensors to threshold downhole conditions. When the readings from the at least two sensors meet or exceed the threshold downhole conditions, the method may include beginning a normal operating condition of the sensor apparatus.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular earth-boring system or component thereof, but are merely idealized representations employed to describe illustrative embodiments. The drawings are not necessarily to scale.

As used herein, the terms "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art. Earth-boring tools may also include tool control components, such as, directional assemblies, stabilizers, motors, steering pads, etc.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Figure 1:
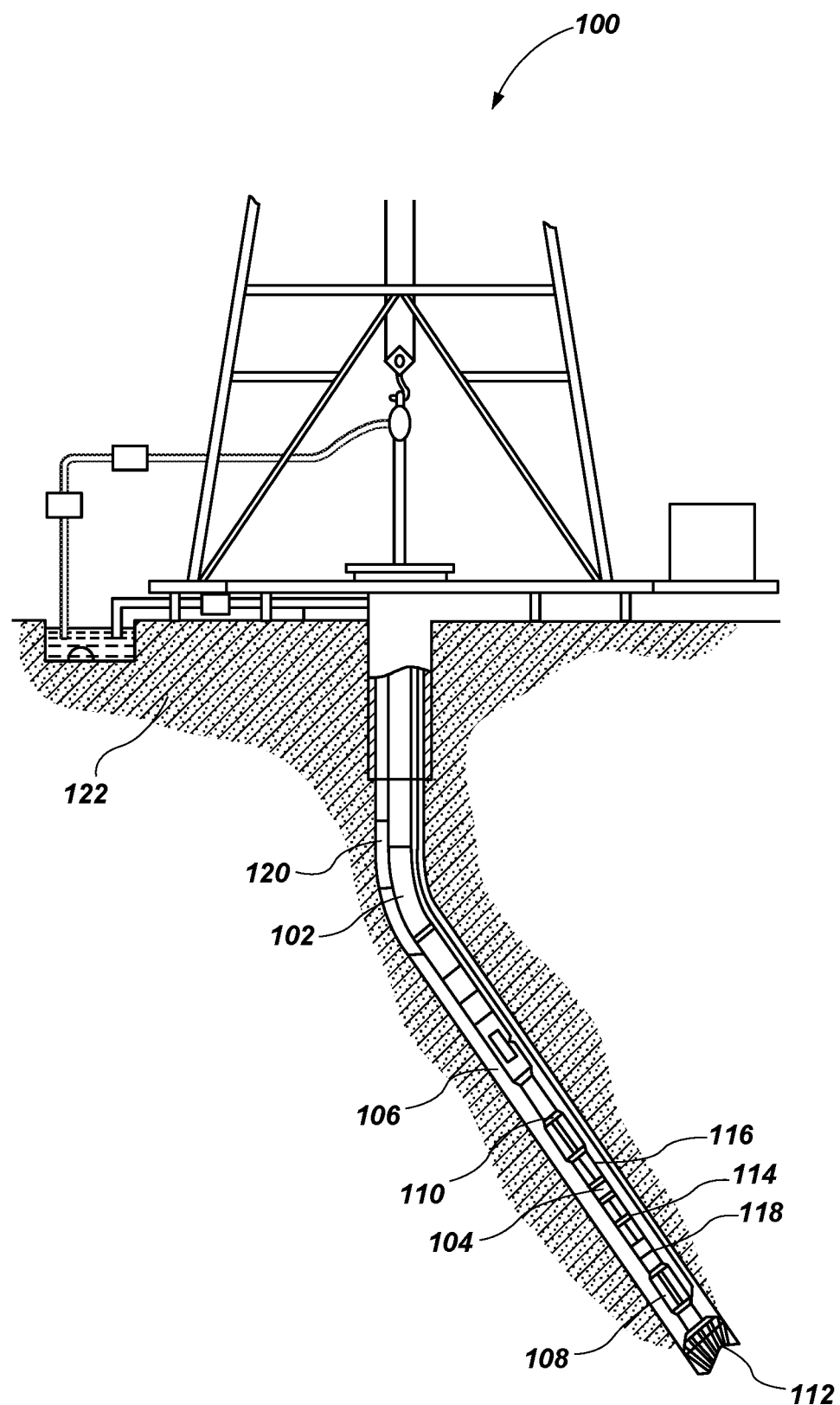
FIG. 1 illustrates an earth-boring system in accordance with an embodiment of the present disclosure.

FIG. 1 illustrates an earth-boring system 100. An earth-boring system 100 may include a drill string 102. The drill string 102 may include multiple sections of drill pipe coupled together to form a long string of drill pipe. A forward end of the drill string 102 may include a bottom hole assembly 104 (BHA). The BHA 104 may include components, such as a motor 106 (e.g., mud motor), one or more reamers 108 and/or stabilizers 110, and an earth-boring tool 112 such as a drill bit. The BHA 104 may also include electronics, such as sensors 114, modules 116, and/or tool control components 118. The drill string 102 may be inserted into a borehole 120. The borehole 120 may be formed by the earth-boring tool 112 as the drill string 102 proceeds through a formation 122. The tool control components 118 may be configured to control an operational aspect of the earth-boring tool 112. For example, the tool control components 118 may include a steering component configured to change an angle of the earth-boring tool 112 with respect to the drill string 102 changing a direction of advancement of the drill string 102. The tool control components 118 may be configured to receive instructions from an operator at the surface and perform actions based on the instructions. In some embodiments, control instructions may be derived downhole within the tool control components 118, such as in a closed loop system, etc.

The sensors 114 may be configured to collect information regarding the downhole conditions such as temperature, pressure, vibration, fluid density, fluid viscosity, cutting density, cutting size, cutting concentration, etc. In some embodiments, the sensors 114 may be configured to collect information regarding the formation, such as formation composition, formation density, formation geometry, etc. In some embodiments, the sensors 114 may be configured to collect information regarding the earth-boring tool 112, such as tool temperature, cutter temperature, cutter wear, weight on bit (WOB), torque on bit (TOB), string rotational speed (RPM), drilling fluid pressure at the earth-boring tool 112, fluid flow rate at the earth-boring tool 112, etc.

The information collected by the sensors 114 may be processed, stored, and/or transmitted by the modules 116. For example, the modules 116 may receive the information from the sensors 114 in the form of raw data, such as a voltage (e.g., 0-10 VDC, 0-5 VDC, etc.), an amperage (e.g., 0-20 mA, 4-20 mA, etc.), or a resistance (e.g., resistance temperature detector (RTD), thermistor, etc.). The module 116 may process raw sensor data and transmit the data to the surface on a communication network, using a communication network protocol to transmit the raw sensor data. The communication network may include, for example a communication line, mud pulse telemetry, electromagnetic telemetry, wired pipe, etc. In some embodiments, the modules 116 may be configured to run calculations with the raw sensor data, for example, calculating a viscosity of the drilling fluid using the sensor measurements such as temperatures, pressures or calculating a rate of penetration of the earth-boring tool 112 using sensor measurements such as cutting concentration, cutting density, WOB, formation density, etc.

In some embodiments, the downhole information may be transmitted to the operator at the surface or to a computing device at the surface. For example, the downhole information may be provided to the operator through a display, a printout, etc. In some embodiments, the downhole information may be transmitted to a computing device that may process the information and provide the information to the operator in different formats useful to the operator. For example, measurements that are out of range may be provided in the form of alerts, warning lights, alarms, etc., some information may be provided live in the form of a display, spreadsheet, etc., whereas other information that may not be useful until further calculations are performed may be processed and the result of the calculation may be provided in the display, print out, spreadsheet, etc.

In some embodiments, the downhole information may be stored in the sensors 114 or modules 116 and downloaded by an operator when the earth-boring tool 112 and/or the drill string 102 are tripped out of the hole. In some cases, the sensors 114 and/or modules 116 may be positioned in areas of the earth-boring tool 112 and/or drill string 102 where it is difficult to connect wiring between modules 116, such as network or power wiring. Thus, it may be difficult to power the sensors 114 and/or modules 116 and access the downhole information stored in and/or measured by the sensors 114 and modules 116.

In some cases, the sensors 114 and/or modules 116 may include internal power storage, such as batteries, battery packs, power cells, etc. In some cases, the sensors 114 and/or the modules 116 may include internal storage and or processors, configured to process and store the downhole information. Sensors 114 and/or modules 116 with internal power storage and/or data storage may require additional considerations. For example, the internal power storage may have a limited amount of power stored therein. Thus, if the internal power storage exhausts the power stored therein the associated sensors 114 and/or modules 116 may stop collecting downhole information before the sensors 114 and/or modules 116 are removed from the borehole 120. In some cases, accessing the downhole information stored in the internal power storage may be difficult. For example, the data storage for the sensors 114 and/or the modules 116 may be positioned within the associated downhole tool. The downhole tool and/or housings, coverings, etc., may protect the sensitive electronics such as the data storage from downhole conditions that may include high temperatures, high pressures, debris, corrosive liquids, etc. Thus, accessing the downhole information may require removing the sensors 114 and/or modules 116 from the downhole tool after the downhole tool is removed from the borehole 120, which may require additional time and/or sophisticated tools and/or operators to complete. Furthermore, removing the sensors 114 and/or the modules 116 from the downhole tool may increase the chances that one or more of the sensors 114 and/or the modules 116 may be damaged during the removal process, which may cause the downhole information to become corrupted or lost.

Embodiments of the present disclosure may include self-contained sensors or modules configured withstand downhole conditions and transmit data to an external device without being removed from the downhole tool. Furthermore, embodiments of the present disclosure may include power saving elements and procedures configured to extend the service life of the internal power storage for a self-contained sensor or module.

Figure 2:
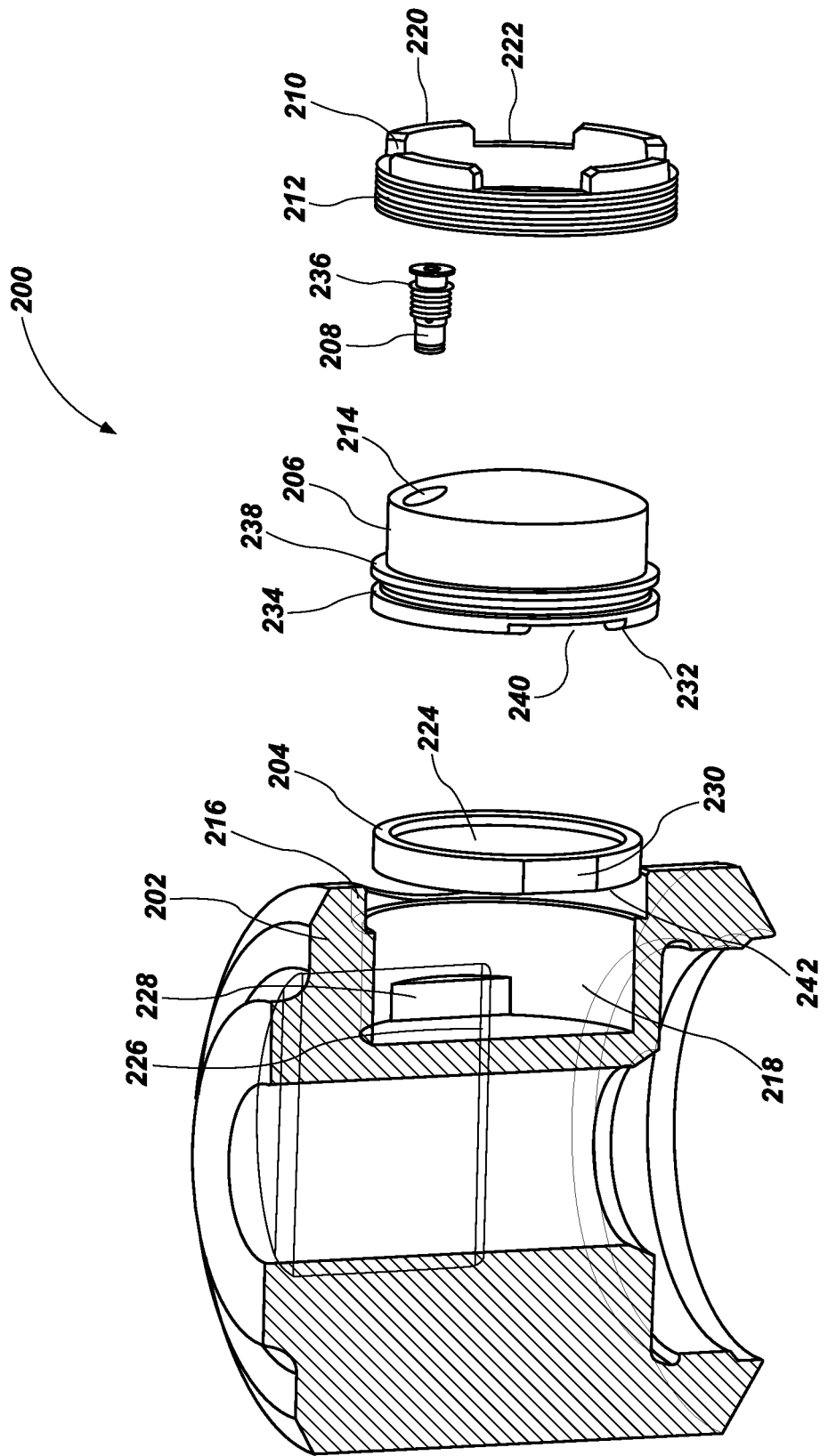
FIG. 2 illustrates an exploded view of an embodiment of a sensor assembly in accordance with an embodiment of the present disclosure.

FIG. 2 illustrates an exploded view of an embodiment of a self-contained sensor assembly 200. The self-contained sensor assembly 200 may be configured to be inserted into a downhole tool 202, such as a drill bit, an under reamer, a reamer, a stabilizer, a mud motor, a measuring while drilling (MWD) subassembly, a logging while drilling (LWD) subassembly, etc. The self-contained sensor assembly 200 may include a sensor structure 204, a cap 206, a data port 208, and a locking ring 210.

The sensor structure 204 may include a sensor board 224 (e.g., circuit board). The sensor board 224 may house one or more sensors, such as accelerometers, pressure sensors, temperature sensors, vibration sensors, strain gauges, gyroscopes, gyrometers, magnetometers, etc. The one or more sensors may be arranged about the sensor board 224 such that multiple different types of information may be measured and/or calculated based on the sensor readings. For example, arrangements of multiple accelerometers may enable the sensor board 224 to measure and/or calculate operational elements, such as rotational speed, tilt angle, azimuth, azimuthal acceleration, tangential acceleration, lateral acceleration, etc. Some examples of sensor arrangements and methods of capturing different types of information are described in, for example, U.S. patent application Ser. No. 16/945,471, filed on Jul. 31, 2020, and titled "SENSOR ARRANGEMENTS AND ASSOCIATED METHODS AND SYSTEMS," the disclosure of which is incorporated herein in its entirety by this reference. In some embodiments, multiple different types of sensors may be included on the same sensor board 224. For example, the sensor board 224 may include multiple accelerometers, as well as one or more pressure sensors, temperature sensors, vibration sensors, strain gauges, gyroscopes, gyrometers, and/or magnetometers.

In some embodiments, the sensor board 224 may include a processor and a memory storage device, configured to process and/or store data gathered (e.g., sensed, detected, measured, etc.) by the one or more sensors. For example, the processor and memory storage may be configured to process raw data from the one or more sensors and store the resulting downhole information. In some embodiments, the processor and memory storage may store the raw sensor information, such as in a database or array, such that a processor may calculate downhole information from the raw sensor information after the raw data is extracted from the memory storage device. In some embodiments the processor may be part of an external device configured to calculate downhole information after the data is transmitted from the sensor board 224 to the external device.

In some embodiment, the sensor board 224 may include a power storage device, such as a battery, capacitor, etc. In some embodiments, the sensor board 224 may include power connections, such as leads, wires, terminals, posts, plugs, etc., configured to connect the sensor board 224 to a remote power source, such as a battery or battery pack.

Figure 6:
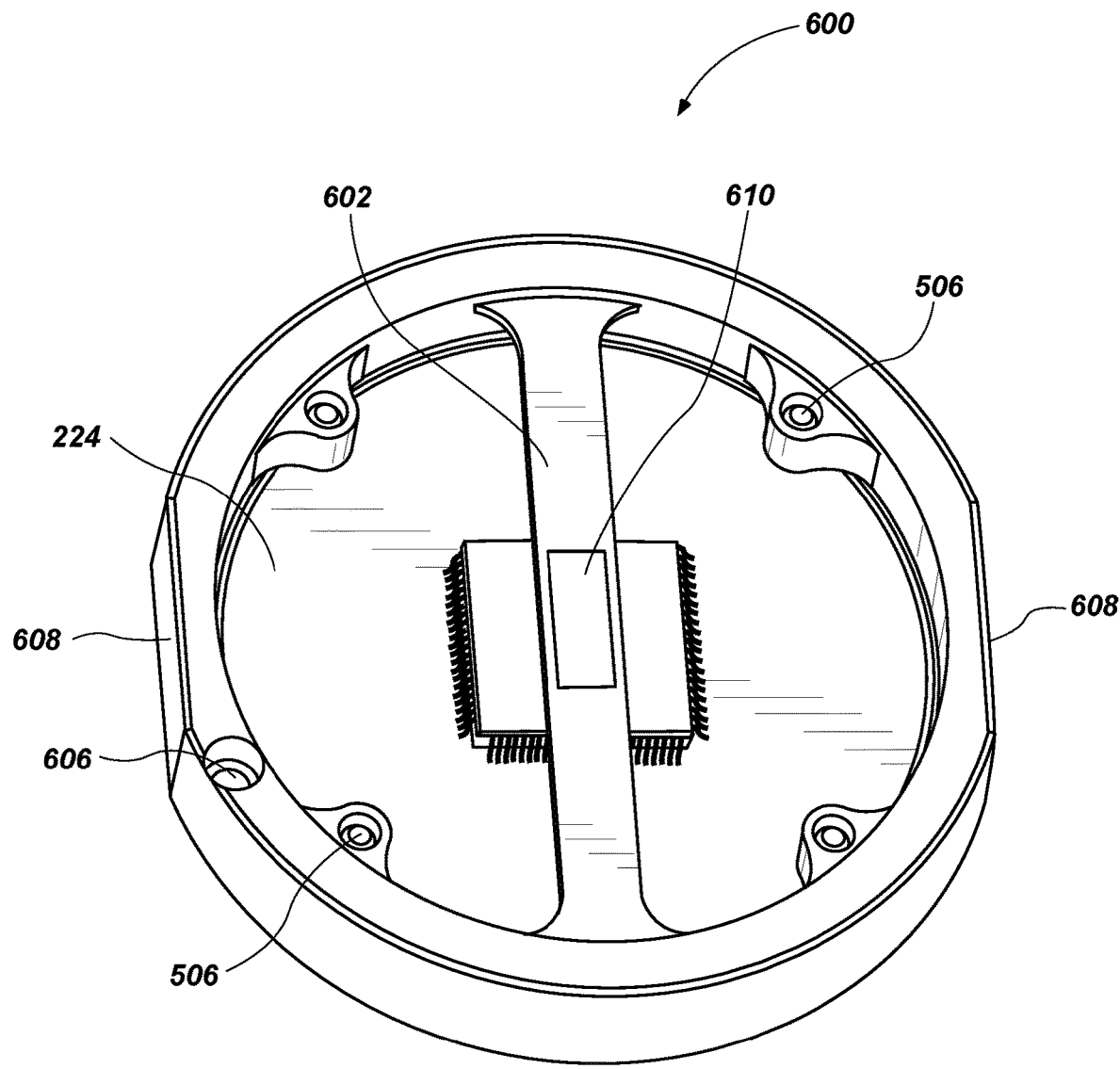
FIG. 6 illustrates a planar view of an embodiment of a sensor structure in accordance with an embodiment of the present disclosure.

The sensor structure 204 may be configured to provide structural support to the sensor board 224. For example, the sensor structure 204 may substantially surround the sensor board 224. In some embodiments, the sensor structure 204 and the sensor board 224 may be substantially circular, such that the sensor structure 204 may be an annular structure substantially surrounding the sensor board 224. The sensor structure 204 may extend above and below a top and bottom surface of the sensor board 224 greater than any semiconductor device attached to the surface of the sensor board 224. For example, if placed against a substantially flat surface the sensor structure 204 may be the only portion of the sensor structure 204 and the sensor board 224 to contact the substantially flat surface. In some embodiments, the sensor structure 204 may include additional structural pieces, such as bracing and/or mounting brackets, as shown in FIG. 6, to provide further support and protection to the sensor board 224. In some embodiments, the sensor structure 204 may be configured to fully encapsulate the sensor board 224.

In some embodiments, the sensor structure 204 may be configured to orient the sensor board 224 relative to the downhole tool 202. For example, the sensor structure 204 may be configured to be disposed into a recess 218 in the downhole tool 202. The sensor structure 204 may rest against a recess base 226 within the recess 218 of the downhole tool 202. The recess base 226 may be configured to interface with a bottom surface 242 of the sensor structure 204, such that the recess base 226 defines a radial position of the sensor structure 204 relative to the downhole tool. The sensor structure 204 may include a key surface 230 configured to orient the sensor structure 204 within the recess 218. For example, the recess 218 may include a complementary orientation key 228 configured to interface with the key surface 230 in the sensor structure 204. As illustrated in FIG. 2, the orientation key 228 and the key surface 230 may be complementary flat (e.g., planar or straight) surfaces in otherwise circular surfaces. In some embodiments, the orientation key 228 and the key surface 230 may be a complementary protrusion and groove, such as a key and a key way.

In some embodiments, the orientation key 228 and the key surface 230 may be configured to only allow the sensor structure 204 to be inserted in the recess 218 in a single orientation. In some embodiments, the orientation key 228 and the key surface 230 may be configured to only allow the sensor structure 204 to be inserted into the recess 218 in one of a select number of orientations such as two orientations, four orientations, etc. For example, the orientation key 228 and the key surface 230 may allow the sensor structure 204 to be inserted into the recess 218 in two orientations each 180 degrees offset from the other. In some embodiments, the orientation key 228 and the key surface 230 may allow the sensor structure 204 to be inserted into the recess 218 in one of four orientations each 90 degrees offset from the other.

In some embodiments, the orientation key 228 and the recess base 226 may be calibration surfaces configured to define an orientation and/or position of the sensor structure 204 and any associated sensors relative to the downhole tool 202. The interfaces between the orientation key 228 and the key surface 230 and/or the recess base 226 and the bottom surface 242 of the sensor structure may determine the accuracy of the sensors associated with the sensor structure 204. For example, some sensor measurements may be affected by an orientation and/or position of the sensor relative to the downhole tool 202. In some embodiments, tolerance errors in any of the orientation key 228, key surface 230, recess base 226, and/or bottom surface 242 may transfer into the measurements from the associated sensors.

Controlling the orientation of the sensor board 224 may enable sensors thereon to measure specific characteristics of the downhole tool 202, such as orientation, rotational velocity, vibrations, torque, tilt, etc. For example, positioning several sensors in specific orientations relative to the downhole tool 202 may enable differences between the sensors to be used to calculate specific characteristics of the downhole tool 202 as described in for example, U.S. patent application Ser. No. 16/945,471, filed on Jul. 31, 2020, and titled "SENSOR ARRANGEMENTS AND ASSOCIATED METHODS AND SYSTEMS," the disclosure of which has been previously incorporated by reference herein.

The cap 206 may be configured to rest against a top surface of the sensor structure 204. The cap 206 may secure the sensor structure 204 within the recess 218 in the downhole tool 202. For example, the cap 206 may sandwich the sensor structure 204 between a base 232 of the cap 206 and the recess base 226. The cap 206 may be configured to separate the sensor board 224 from the downhole environment. For example, the downhole environment may include high temperatures, high pressures, debris, and fluids (e.g., oil, water, drilling mud, caustic fluids, corrosive fluids, etc.). The cap 206 may be formed from a material configured to withstand the downhole environment and protect the sensor board 224 from the elements of the downhole environment that may damage the sensor board 224 and/or the components thereof.

In some embodiments, the cap 206 may be configured to transfer one or more elements of the downhole environment to the sensor board 224. For example, the cap 206 may transfer pressure from the downhole environment to the sensor board 224. A pressure sensor on the sensor board 224 may measure the pressure transferred through the cap 206. For example, the cap 206 may be configured to act as a diaphragm deforming under external pressure until the pressure on both sides of the cap 206 equalizes. In some embodiments, the cap 206 may be configured such that a portion of the cap 206 is configured to move relative to the sensor board 224. The movable portion of the cap 206 may move in or out of the cap 206 to equalize the pressure on each side of the portion of the cap 206. A pressure sensor on the sensor board 224 may measure the pressure in a cavity 302 (FIG. 3) formed between the cap 206 and the recess 218 of the downhole tool 202, or the area around the sensor board 224. When the pressure is equalized on each side of the cap 206 or portion of the cap 206, the pressure around the sensor board 224 may be substantially the same as the downhole pressure.

The cap 206 may include one or more seal grooves 234 around the base 232. The seal grooves 234 may be configured to receive one or more seals configured to form a seal between the cap 206 and a wall of the recess 218 in the downhole tool 202. The one or more seals may be configured to substantially prevent the ingress and/or egress of fluids into and/or out of the cavity 302.

The cap 206 may include one or more recesses 240 in the base 232 of the cap 206. In some embodiments, the recesses 240 may be configured to interface with the orientation key 228 and/or the key surface 230 to position the cap 206 relative to the sensor structure 204 and/or the downhole tool 202. For example, the recesses 240 may encompass the region defined by the orientation key 228 of the recess 218 and the key surface 230 of the sensor structure 204, such that the recesses 240 may substantially prevent rotation of the cap 206 relative to the sensor structure 204 and the downhole tool 202.

The cap 206 may include an aperture 214. The aperture 214 may be configured to receive the data port 208. The data port 208 may be coupled to the sensor board 224 through the cap 206. For example, the data port 208 may be connected to wires or leads extending from the sensor board 224. In some embodiments, the data port 208 may be connected to a connector, such as a pin connector, locking connector, terminal connector, high speed serial peripheral interface (high speed spi), etc. In some embodiments, the data port 208 may be wirelessly connected to the sensor board 224, such as through a radio frequency transmitter and/or receiver.

In some embodiments, the data port 208 may be configured as a data access port of the sensor board 224. For example, the data port 208 may be operatively connected to the sensor board 224, such as to the processor or memory device in the sensor board 224. The data port 208 may be configured to enable a connection to the sensor board 224 through the cap 206 without requiring the removal of the self-contained sensor assembly 200 from the downhole tool 202. For example, the data port 208 may include a connector configured to receive a wired connection, such as a network connection (e.g., ethernet, RJ45, RJ11, RJ12, RS485, etc.) or serial connection (e.g., DB9, RS-232, universal serial bus (USB), etc.) from an external source, such as a computer, tablet, network connection, server, controller, etc.

In some embodiments, the data port 208 may be configured to wirelessly transmit data from the sensor board 224. For example, the data port 208 may be a wireless receiver and/or transmitter. The data port 208 may be configured to transmit data under a wireless protocol, such as BLUETOOTH®, 2G, 3G, 4G, 5G, RFID, WIFI, etc. For example, the data port 208 may receive downhole information and/or raw sensor data, such as the data stored in the memory device of the sensor board 224.

In some embodiments, the data port 208 may be configured to receive data, such as configuration data, programming data, firmware, updates, etc., from an external device (e.g., computer, tablet, network, server, cloud, etc.). For example, the data port 208 may be configured to receive the data from the external device and push the data into the sensor board 224. In some embodiments, the data may change an operation of the sensor board 224, such as a sequence of operations, a method of converting sensor readings, a method of storing sensor readings, etc. In some embodiments, the data may correct software problems, such as software patches, bug fixes, etc. In some embodiments, the data may configure the sensor board 224 for operation in a different type of operation, such as for placement on a different type of tool, placement in a different portion of a drill string, using a tool in a different operation, etc. In some embodiments, the data may be calibration coefficients and/or logged data.

In some embodiments, the cap 206 may include a removable plug 236 over the aperture 214. For example, after the data port 208 is inserted into the aperture 214 of the cap 206, the plug 236 may be installed into the aperture 214. The plug 236 may be configured to protect the data port 208 from the downhole environment, similar to the protections afforded to the sensor board 224 by the cap 206. The plug 236 may be configured to be removed to enable a connection with the data port 208 from an external device. For example, with the plug 236 removed a wired connection, as described above, may be connected to the data port 208. In some embodiments, removing the plug 236 may enable the data port 208 to send and or receive a reliable wireless signal to and/or from an external device as described above.

In some embodiments, the plug 236 may include other integrated devices, such as sensors. For example, the plug 236 may include a pressure sensor. In some embodiments, the plug 236 may be a removable pressure transducer configured to measure pressure and simultaneously protect the data port 208 from the downhole environment. In some embodiments, the pressure transducer may be coupled to the sensor board 224 through the data port 208. In some embodiments, the pressure transducer may be wirelessly coupled to the sensor board 224. In some embodiments, the pressure transducer may be coupled to another sensor module. In some embodiments, the pressure transducer may be substantially standalone.

In some embodiments, the cap 206 may include an area of the cap 206 that is configured to be transparent to radio frequencies (e.g., RF transparent, RF window, etc.). For example, at least a portion of the cap 206 may be formed from a material that is substantially transparent to radio frequencies. A radio frequency transparent material is a material that radio frequency fields or signals may penetrate without losing energy to heat or reflecting off the material, such as polytetrafluoroethylene (e.g., PTFE, TEFLON®), quartz, glass materials, high temperature polyehteretherketone (PEEK), etc. In some embodiments, the cap 206 may be entirely formed from a radio frequency transparent material. The radio frequency transparent material may enable a transmitter and/or receiver to send and/or receive radio signals through the cap 206.

In some embodiments, the data port 208 may be formed in a manner to withstand the downhole environment without the plug 236. For example, the data port 208 may be formed from materials configured to withstand the downhole environment. In some embodiments, the data port 208 may include a type of connection configured to protect the conducting elements, such as a covered connection or a wireless connection.

The cap 206 may include a ridge 238 above the seal grooves 234. The locking ring 210 may be configured to rest against the ridge 238 securing the cap 206 in the recess 218 of the downhole tool 202. The locking ring 210 may include threads 212 configured to interface with complementary threads 216 in the downhole tool 202. For example, once the sensor structure 204 and the cap 206 are disposed in the recess 218 of the downhole tool 202, the locking ring 210 may engage the threads 216 in the recess 218 with the threads 212 of the locking ring 210. The locking ring 210 may be threaded into the recess 218 until the locking ring 210 engages the ridge 238 of the cap 206.

The locking ring 210 may have an inside diameter that is substantially the same or greater than a diameter of the cap 206 above the ridge 238. For example, the locking ring 210 may be configured to pass over a top portion of the cap 206 to rest on the ridge 238.

In some embodiments, the locking ring 210 may be configured to tighten into the threads 216 of the recess 218 of the downhole tool 202 without contacting the ridge 238 of the cap 206. For example, the cap 206 may be configured to move relative to the downhole tool 202 and the locking ring 210 after the locking ring 210 is secured. The locking ring 210 may be configured to prevent the cap 206 from exiting the recess 218 while allowing the cap 206 to move within the recess 218. Such movement may enable the cap 206 to equalize pressure between the downhole environment and the cavity 302 (FIG. 3), as described above.

The locking ring 210 may include one or more ridges 220 separated by one or more valleys 222 on a surface of the locking ring 210. The ridges 220 and the valleys 222 may be arranged in a pattern about a circumference of the locking ring 210. The ridges 220 and the valleys 222 may be configured to be engaged by a tool, such as a socket, wrench, screw driver, etc., to tighten and/or loosen the locking ring 210 from the downhole tool 202.

The locking ring 210 may enable the sensor structure 204 and the cap 206 to be installed in a specific orientation relative to each other and the downhole tool 202. As discussed above, the sensor structure 204 may include a key surface 230 configured to limit the orientation of the sensor structure 204 and the sensor board 224 relative to the downhole tool 202. The data port 208 may be installed through the aperture 214 in the cap 206. In some embodiments, the aperture 214 may need to be arranged over a specific portion of the sensor board 224 to enable a connection between the data port 208 and the sensor board 224. In some embodiments, wires may extend from the sensor board 224 through the aperture 214 for connection to the data port 208. Turning the cap 206 relative to the sensor board 224 multiple times, such as to screw in the cap 206 may cause the wires to twist multiple times, which may cause damage to the wires and/or the sensor board 224 where the wires connect to the sensor board 224. The locking ring 210 may enable the sensor structure 204 and the cap 206 to be disposed into the recess 218 in the downhole tool 202 with minimal twisting of the sensor structure 204 and/or the cap 206 relative to one another and the downhole tool 202.

In some embodiments, the sensor structure 204 may be separately secured in the recess 218. For example, the sensor structure 204 may be individually secured in the recess 218 through a friction fit (e.g., press fit, interference fit, etc.), through an adhesive (e.g., epoxy, glue, etc.), or other physiochemical process (e.g., brazing, welding, soldering, etc.).

Figure 3:
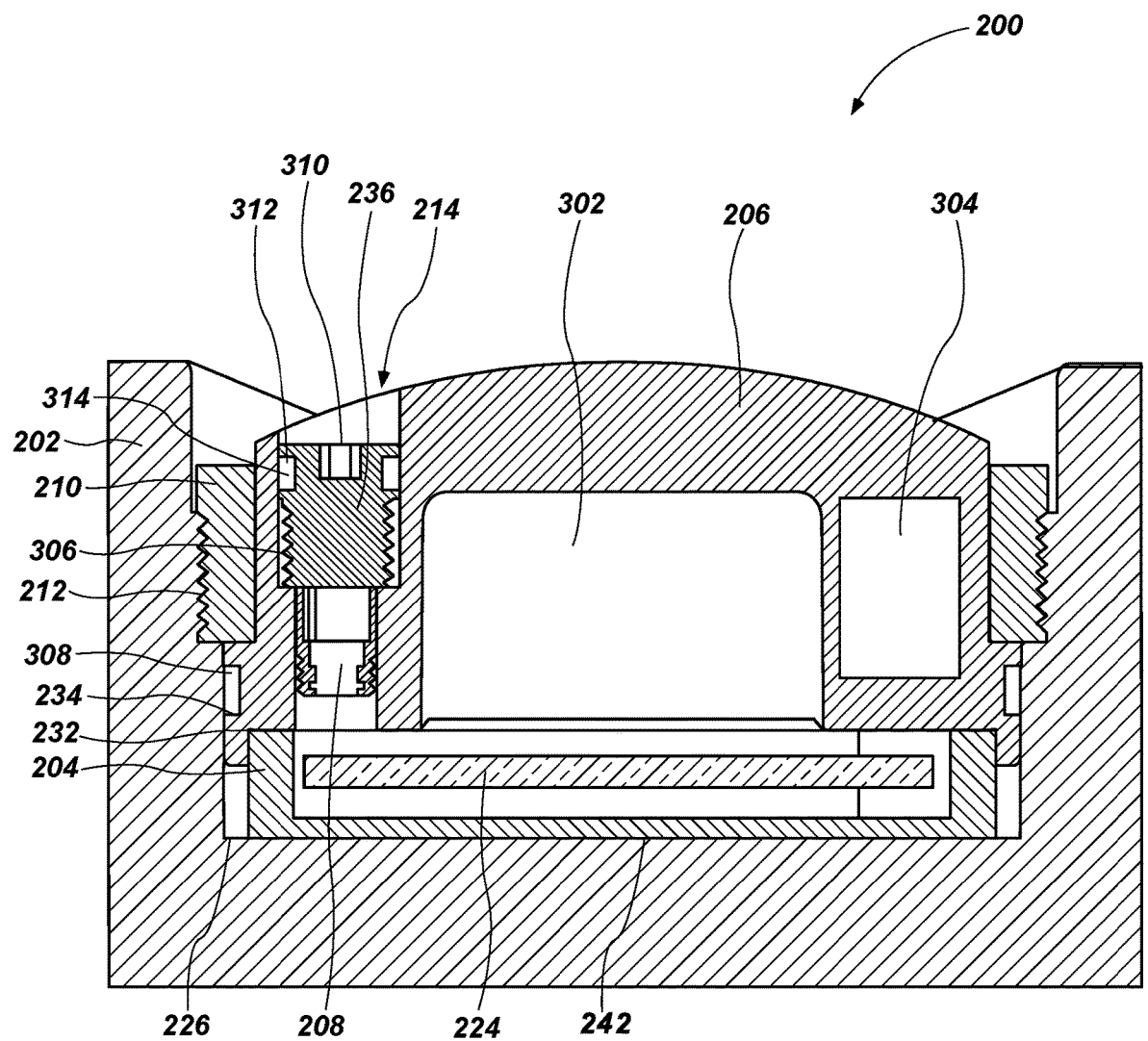
FIG. 3 illustrates a cross-sectional view of the embodiment of the sensor assembly illustrated in FIG. 2, in accordance with an embodiment of the present disclosure.

FIG. 3 illustrates a cross-sectional view of the self-contained sensor assembly 200. The sensor structure 204 may rest against the recess base 226 of the downhole tool 202. The base 232 of the cap 206 may rest against a top surface of the sensor structure 204. The sensor structure 204 may be secured between the cap 206 and the downhole tool 202. The sensor board 224 may be secured to the sensor structure 204.

In some embodiments, the sensor structure 204 may have a height that is greater than the sensor board 224 such that the base 232 of the cap 206 may contact the sensor structure 204 without contacting the sensor board 224 or any components thereof. In some embodiments, the cap 206 may form a cavity 302 between the cap 206 and the sensor board 224 and/or the recess base 226. In some embodiments, the cavity 302 may allow portions of the sensor board 224 or components thereof to extend above the sensor structure 204 without contacting the cap 206. In some embodiments, the cavity 302 may be configured to contain electrical components, such as batteries, transmitters, etc., that may require additional space. In some embodiments, as described above, the cavity 302 may allow the cap 206 to equalize pressure between the downhole environment and the cavity 302, such that a pressure sensor on the sensor board 224 may measure a pressure of the downhole environment.

In some embodiments, the cap 206 may include a battery 304 incorporated into the cap 206. For example, the cap 206 may be formed around the battery 304. In some embodiments, the battery 304 may be formed as part of the cap 206, such as including multiple battery cells embedded into the cap 206. In some embodiments, the cap 206 may include one or more cavities configured to receive the battery 304 and/or secure the battery 304 therein.

In some embodiments, the battery 304 may be configured to connect to leads or wires extending from the sensor board 224 into the cap 206. In some embodiments, the cap 206 may be configured to electrically couple the battery 304 to the sensor board 224, such as through electrical contacts, pins, sockets, etc., in the cap 206 configured to electrically couple to a complementary electrical connection on the sensor board 224.

The cap 206 may include one or more seal grooves 234 in the base 232 of the cap 206. A seal 308 may be arranged within the seal groove 234. The seal 308 may be configured to form a seal between the base 232 of the cap 206 and the downhole tool 202. For example, the seal 308 may be formed from a resilient material, such as a polymer, rubber, etc. In some embodiments, the seal 308 may be an annular ring, such as an O-ring, D-ring, etc. The seal 308 may be configured to substantially prevent the ingress of fluid or debris from the downhole environment into the cavity 302.

The data port 208 may be inserted into the aperture 214 in the cap 206. The plug 236 may be disposed above the data port 208 in the aperture 214. In some embodiments, the plug 236 may be secured with a threaded engagement 306. The plug 236 may be configured to substantially prevent fluids and/or debris present downhole from contacting, interfering with, getting caught in, and/or plugging the data port 208.

The plug 236 may include a tool interface 310 in a top portion of the plug 236. The tool interface 310 may be configured to receive a tool, such as a screw head, torx head, Allen head, bolt head, etc. The tool interface 310 may enable a hand tool or power tool to interface with the plug 236 when installing and/or removing the plug, such that the plug may be screwed in or out with the aid of the tool. The tool interface 310 may enable the plug 236 to be removed easily to quickly access the data port 208 when interfacing with the sensor board 224.

The plug 236 may include one or more seal grooves 314. One or more seals 312, such as O-rings, D-rings, etc., may be disposed in the seal grooves 314. The one or more seals 312 may be configured to form a seal between the plug 236 and the cap 206. For example, the one or more seals 312 may substantially prevent the ingress of downhole fluid or debris into the data port 208.

Figure 4:
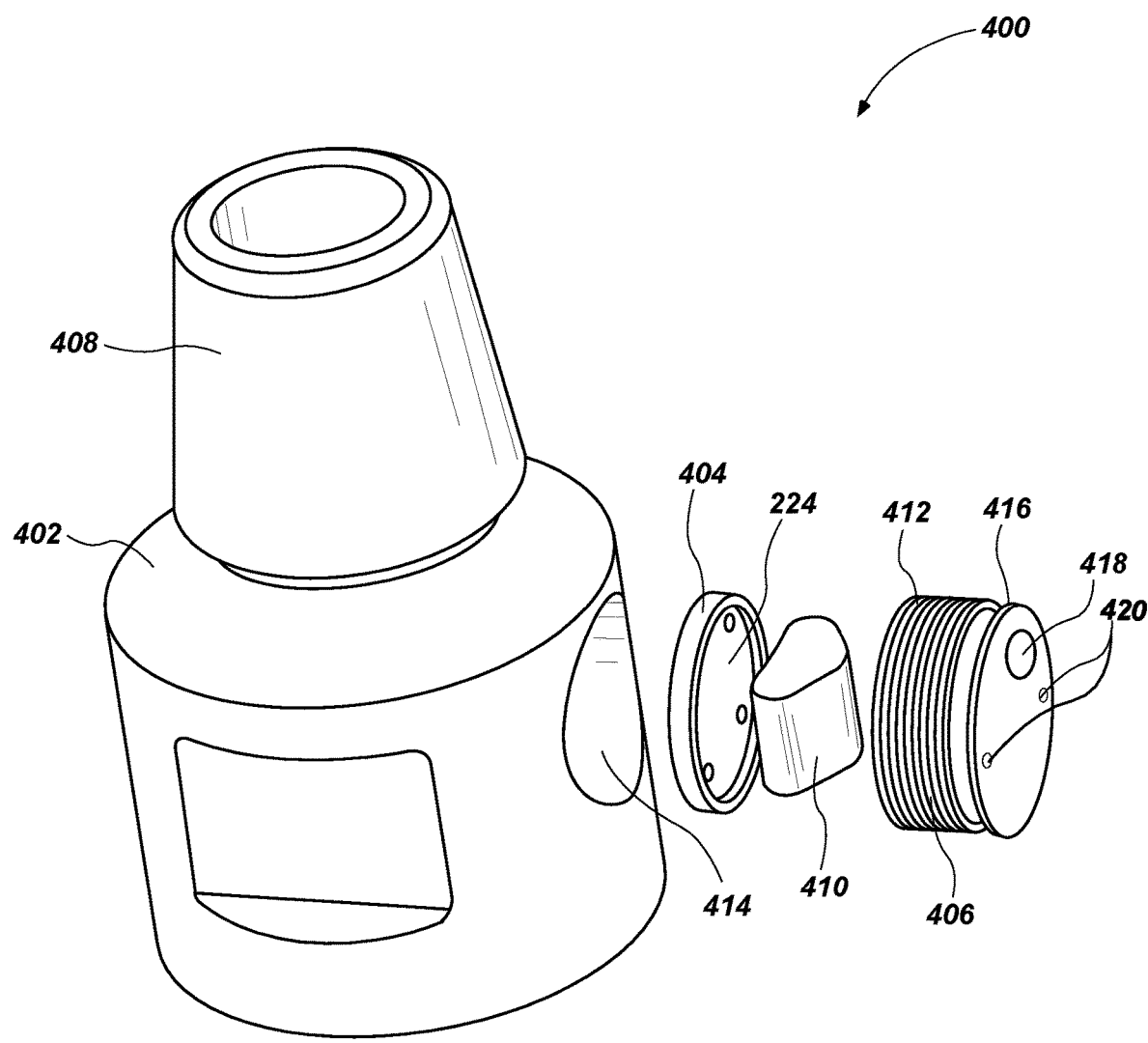
FIG. 4 illustrates an exploded view of an embodiment of a sensor assembly in accordance with an embodiment of the present disclosure.

FIG. 4 illustrates an embodiment of a self-contained sensor assembly 400. The self-contained sensor assembly 400 may be installed near a shank 408 of a downhole tool 402, such as a drill bit, a reamer, a back reamer, a stabilizer, etc. The downhole tool 402 may include a recess 414 into to the downhole tool 402. The recess 414 may be configured to receive the self-contained sensor assembly 400. For example, the recess 414 may have a complementary shape to the self-contained sensor assembly 400, such as a circular shape, keying features, complementary threads, etc., as described above.

The self-contained sensor assembly 400 may include a sensor structure 404 configured to support and/or secure the sensor board 224. As described above, the sensor board 224 may house one or more sensors, such as accelerometers, pressure sensors, temperature sensors, vibration sensors, strain gauges, gyroscopes, gyrometers, magnetometers, etc. The one or more sensors may be arranged about the sensor board 224 such that multiple different types of information may be measured and/or calculated based on the sensor readings. For example, arrangements of multiple accelerometers may enable the sensor board 224 to measure and/or calculate operational elements, such as rotational speed, tilt angle, azimuth, azimuthal acceleration, tangential vibration, lateral vibration, etc. In some embodiments, multiple different types of sensors may be included on the same sensor board 224. For example, the sensor board 224 may include multiple accelerometers, as well as one or more pressure sensors, temperature sensors, vibration sensors, strain gauges, gyroscopes, gyrometers, and/or magnetometers.

In some embodiments, the sensor board 224 may include a processor and a memory storage device, configured to process and/or store data gathered (e.g., sensed, detected, measured, etc.) by the one or more sensors. For example, the processor and memory storage may be configured to process raw data from the one or more sensors and store the resulting downhole information. In some embodiments, the processor and memory storage may store the raw sensor information, such as in a database or array, such that a processor may calculate downhole information from the raw sensor information after the raw data is extracted from the memory storage device.

The sensor structure 404 may be configured to provide structural support to the sensor board 224. For example, the sensor structure 404 may substantially surround the sensor board 224. In some embodiments, the sensor structure 404 and the sensor board 224 may be substantially circular, such that the sensor structure 404 may be an annular structure substantially surrounding the sensor board 224. In some embodiments, the sensor structure 404 may include additional structural pieces, such as bracing and/or mounting brackets, as shown in FIG. 6, to provide further support and protection to the sensor board 224.

In some embodiments, the sensor structure 404 may be configured to orient the sensor board 224 relative to the downhole tool 402. For example, the sensor structure 404 may be configured to be disposed into a recess 414 in the downhole tool 402. The sensor structure 404 may include a keying feature configured to orient the sensor structure 404 within the recess 414, as described in further detail in FIG. 5.

The cap 406 may be configured to rest against a top surface of the sensor structure 404. The cap 406 may secure the sensor structure 404 within the recess 414 in the downhole tool 402. For example, the cap 406 may sandwich the sensor structure 404 between the cap 206 and a base of the recess 414. The cap 406 may be configured to separate the sensor board 224 from the downhole environment. For example, the cap 406 may be formed from a material configured to withstand the downhole environment and protect the sensor board 224 from the elements of the downhole environment that may damage the sensor board 224 and/or the components thereof.

The cap 406 may include one or more seal grooves 416 around the cap 406. The seal grooves 416 may be configured to receive one or more seals configured to form a seal between the cap 406 and a wall of the recess 414 in the downhole tool 402. The one or more seals may be configured to substantially prevent the ingress of fluids into the recess 414.

The cap 406 may include a communication feature 418. In some embodiments, the communication feature 418 may be an aperture configured to receive a data port 208 (FIG. 2). The data port 208 may be coupled to the sensor board 224 through the communication feature 418 in the cap 406. For example, the data port 208 may be connected to wires or leads extending from the sensor board 224. In some embodiments, the data port 208 may be connected to a connector, such as a pin connector, locking connector, terminal connector, etc. In some embodiments, the data port 208 may be wirelessly connected to the sensor board 224, such as through a radio frequency transmitter and/or receiver.

In some embodiments, the communication feature 418 may be an area of the cap 406 that is configured to be transparent to radio frequencies (e.g., RF transparent, RF window, etc.). For example, at least a portion of the cap 406 may be formed from a material that is substantially transparent to radio frequencies. A radio frequency transparent material is a material that radio frequency fields or signals may penetrate without losing energy to heat or reflecting off the material, such as polytetrafluoroethylene (e.g., PTFE, TEFLON®), quartz, glass materials, etc. In some embodiments, the cap 406 may be entirely formed from a radio frequency transparent material. The radio frequency transparent material may enable a transmitter and/or receiver to send and/or receive radio signals through the cap 406. For example, the sensor board 224 may include a radio frequency transmitter, receiver, transducer, etc., configured to send and/or receive radio signals. In some embodiments, the sensor board 224 may transmit downhole data through the cap 406 to an external device, such as a computer, tablet, server, controller, module, other sensor assembly, etc. In some embodiments, the sensor board 224 may receive radio frequency signals through the cap 406, such as operation commands, data transmissions, configurations, updates, etc.

In some embodiments, the cap 406 may include multiple communication features 418. For example, the cap 406 may include an aperture configured to receive a data port 208 (FIG. 2) and an area of the cap 406 that is configured to be transparent to radio frequencies. In some embodiments, a data port 208 may be coupled to the sensor board 224 through the aperture in the cap 406 and a wireless transmitter and/or receiver may be configured to transmit and/or receive wireless signals through the cap 406. For example, the wireless transmitter and/or receiver may be configured to communicate wirelessly with other elements of the drill string, such as sensors, sensor modules, control components, etc., while the downhole tool 402 is downhole. The data port 208 may be configured to communicate higher volumes of data, such as logging data, calibration data, software and/or firmware updates, etc., through a hardwired connection to a computing device.

The cap 406 may include threads 412 configured to secure the cap 406 to the downhole tool 402. For example, the downhole tool 402 may include complementary threads in the recess 414. The threads 412 may engage the threads in the recess 414 and secure the cap 406 into the recess 414. The cap 406 may be threaded into the recess 414 after the sensor structure 404, such that the sensor structure 404 may be secured between the cap 406 and the downhole tool 402. The cap 406 may be configured to rotate relative to the recess 414 to engage the threads 412. In some embodiments, the cap 406 may include an interfacing feature 420 configured to enable a tool to interface with the cap 406 and rotate the cap 406. In some embodiments, the interfacing feature 420 may be one or more recesses, apertures, or ridges in a surface of the cap 406 configured to interface with a complementary tool.

The self-contained sensor assembly 400 may include a battery pack 410. In some embodiments, the battery pack 410 may be configured to be housed within the cap 406. For example, the cap 406 may define a cavity within the cap 406, such as the cavity 302 (FIG. 3). The battery pack 410 may be housed within the cavity between the cap 406 and the sensor board 224. In some embodiments, the battery pack 410 may be sized and shaped such that the battery pack 410 is substantially the same size as the cavity. In some embodiments, the battery pack 410 may be sized and shaped such that the battery pack 410 only partially fills the cavity.

In some embodiments, the battery pack 410 may be a rechargeable battery pack. In some embodiments, the battery pack 410 may be configured to be recharged and reused in the self-contained sensor assembly 400. For example, the battery pack 410 may be charged between uses and reinstalled in the self-contained sensor assembly 400 before the self-contained sensor assembly 400 is disposed downhole a second time. In some embodiments, the battery pack 410 may be configured to be recharged and transferred to a different self-contained sensor assembly 400 after the self-contained sensor assembly 400 is tripped out of a borehole. In some embodiments, the battery pack 410 may be configured to be charged immediately before disposing the downhole tool 402 into the borehole such that the battery pack 410 may enter the borehole having a full charge rather than losing charge during transport and/or assembly.

In some embodiments, the charge of the battery pack 410 may be conserved by activating and/or deactivating the sensor assembly 400 and/or components of the sensor assembly 400. For example, one or more components of the sensor assembly 400 may be activated through the data port 208. In some embodiments, a connection to the data port 208 may activate one or more components of the sensor assembly 400 and the loss of the connection to the data port 208 may deactivate the one or more components of the sensor assembly 400. In some embodiments, one or more components of the sensor assembly 400 may be activated through a switch. For example, a wireless switch, such as a magnetic switch may be configured to activate and/or deactivate one or more components of the sensor assembly 400. For example, an operator may activate components needed to transfer data during the data transfer and deactivate the components once the data transfer is complete.

Figure 5:
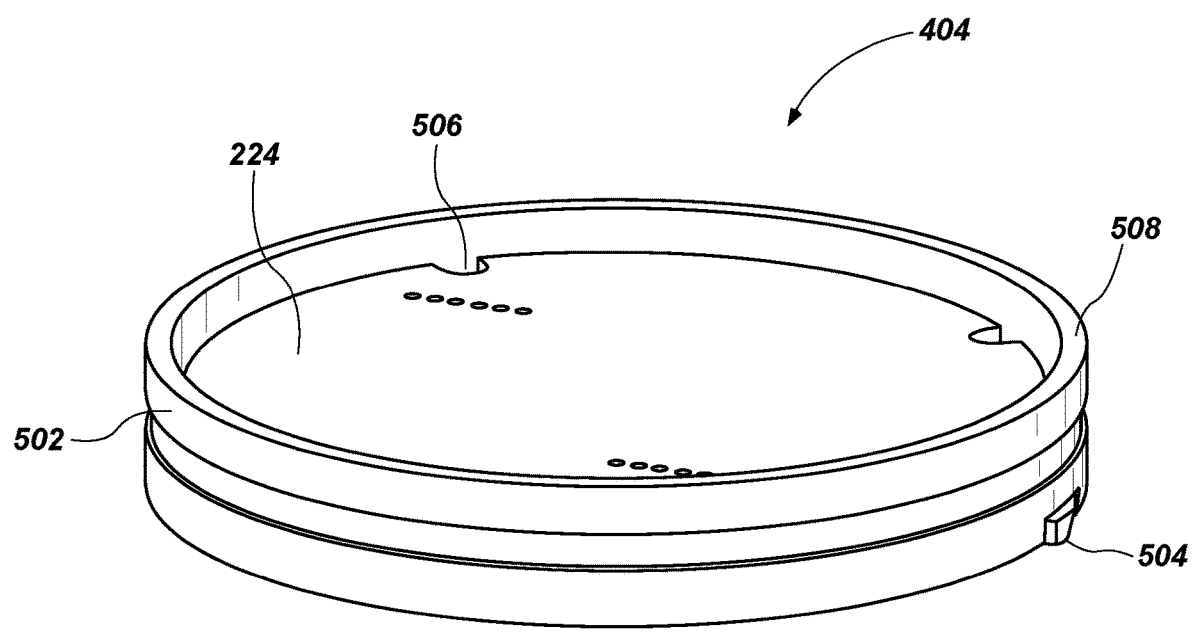
FIG. 5 illustrates a perspective view of an embodiment of a sensor structure in accordance with an embodiment of the present disclosure.

FIG. 5 illustrates an embodiment of the sensor structure 404. The sensor structure 404 may include a side wall 502 configured to surround the sensor board 224. The side wall 502 may include one or more alignment features 506. The alignment features 506 may be configured to secure the sensor board 224 in a specific orientation relative to the sensor structure 404. For example, the alignment features 506 may include complementary alignment tabs and/or grooves. In some embodiments, the alignment features 506 may include mounting hardware, such as screws, nuts, threaded recesses, pins, etc.

The side wall 502 may include a keying feature 504 extending from an outer surface of the side wall 502. The keying feature 504 may be configured to secure the sensor structure 404 in a specific orientation relative to the downhole tool 402 (FIG. 4). For example, the recess 414 may include a complementary feature configured to engage the keying feature 504 substantially preventing the sensor structure 404 from rotating relative to the downhole tool 402 once the keying feature 504 is engaged by the complementary feature in the recess 414.

In some embodiments, the keying feature 504 and the complementary feature may be configured to only engage one another when the sensor structure 404 nears a bottom portion of the recess 414. For example, the sensor structure 404 may rotate freely within the recess 414 as the sensor structure 404 is inserted into the recess 414. In some embodiments, the sensor structure 404 may rotate with the cap 406 as the cap 406 is threaded into the recess 414. When the sensor structure 404 nears the bottom of the recess 414, the keying feature 504 may engage with the complementary feature in the recess 414. The keying feature 504 and the complementary feature may substantially stop any rotation of the sensor structure 404, such that the sensor structure 404 may be in a predetermined orientation relative to the downhole tool 402. In some embodiments, the keying feature 504 and/or the complementary feature may be configured to engage when the cap 406 requires no more than one turn (e.g., 360 degree rotation) to bottom out and/or fully engage a top surface 508 of the side wall 502, securing the sensor structure 404 between the cap 406 and the bottom of the recess 414.

In some embodiments, allowing the sensor structure 404 to rotate relative to the downhole tool 402 while being inserted into the recess 414 may enable wiring to extend between the sensor structure 404 and the cap 406, such as power wiring, data transmission wiring (e.g., wiring to a data port), etc., without causing excessive wire twisting during installation. Avoiding excessive twisting of the wiring may reduce and/or prevent premature failures of the wiring, sensor board 224, and/or sensor elements.

FIG. 6 illustrates a planar view of a sensor structure 600. Features of the sensor structure 600 may be incorporated into either the sensor structure 204 or the sensor structure 404 described above. The sensor structure 600 may be configured to secure the sensor board 224 within a sidewall 604 of the sensor structure 600. The sensor structure 600 may include alignment features 506 configured to secure the sensor board 224 to the sensor structure 600 in a specific orientation. For example, the alignment features 506 may include one or more threaded apertures configured to receive threaded fasteners. The threaded fasteners may be configured to secure the sensor board 224 to the sensor structure 600 through the threaded apertures. In some embodiments, the alignment features 506 may include one or more pins or ridges and/or complementary recesses or grooves.

The sensor structure 600 may include one or more keying features 608. The keying features 608 may be configured to secure the sensor structure 600 in a specific orientation relative to a downhole tool 202, 402, as described above. FIG. 6 illustrates and embodiment of the sensor structure 600 including two flat surfaces on opposite sides of the sidewall 604. The sidewall 604 may have an annular or ring shape. The two flat surfaces may be configured to engage corresponding flat surfaces in a recess 218, 414 in the downhole tool 202, 402, substantially preventing rotation of the sensor structure 600 relative to the downhole tool 202, 402. In some embodiments, the keying features 608 may include one or more protrusions, such as the keying feature 504 described above with respect to FIG. 5. The one or more protrusions may be configured to engage a corresponding recess or groove in the recess 218, 414, substantially preventing rotation of the sensor structure 600 relative to the downhole tool 202, 402.

In some embodiments, the sensor structure 600 may include an aperture 606. In some embodiments, the aperture 606 may be configured to be an additional keying feature. For example, the aperture 606 may be configured to receive a pin protruding from the downhole tool 202, 402. In some embodiments, the aperture 606 may be configured to allow wiring to pass between a front side of the sensor board 224 and a rear side of the sensor board 224. In some embodiments, the aperture 606 may be configured to house an electronic device such as a sensor, a data connection, a plug, etc. For example, some sensors, such as temperature sensors, may need to be isolated from the sensor board 224 to capture accurate readings. In some embodiments, the sensor structure 600 may secure a data connection or plug into the sidewall 604 of the sensor structure 600 such that the data connection or plug is positioned in a specific position and/or orientation in the sidewall 604 and supported by the sidewall 604.

The sensor structure 600 may include one or more braces 602 extending across an open area defined by the sidewall 604. The braces 602 may extend between portions of the sidewall 604 connecting the portions of the sidewall 604 through a central portion of the sensor structure 600. The braces 602 may increase a strength of the sensor structure 600 providing increase support to the sensor board 224. In some embodiments, the braces 602 may be configured to provide greater protection to a back side of the sensor board 224 and any components extending therefrom. For example, the braces 602 may be configured to contact a bottom of the recess 218, 414 before the sensor board 224 and/or any component thereof contacts the bottom of the recess 218, 414.

In some embodiments, a sensor 610 may be coupled to one or more of the braces 602. The sensor 610 may be configured to measure mechanical properties of the sensor structure 600 and/or the associated brace 602, such as strain, bending forces, compression forces, tension forces, etc. For example, the sensor 610 may be a strain gauge. The mechanical properties measured by the sensor 610 may be interpreted to determine properties of the downhole environment, such as pressure. For example, as pressure increases in the downhole environment, the stresses transferred to the sensor structure 600 may increase. The increases stresses may then be correlated to the increase in downhole pressure. In some embodiments, the mechanical properties measured by the sensor 610 may be interpreted to identify environmental and/or operational factors, such as sudden accelerations or decelerations, impacts, tool strain, tool stresses, etc. For example, stresses in the downhole tool 202, 402 may be transmitted to the sensor structure 600 and measured by the sensor 610. In some embodiments, the mechanical properties measured by the sensor 610 may be used to determine stress levels in the sensor structure 600. Detecting stress levels in the sensor structure 600 may enable a processor or user to determine when stress limits or wear limits of the sensor structure 600 are substantially reached.

Figure 7:
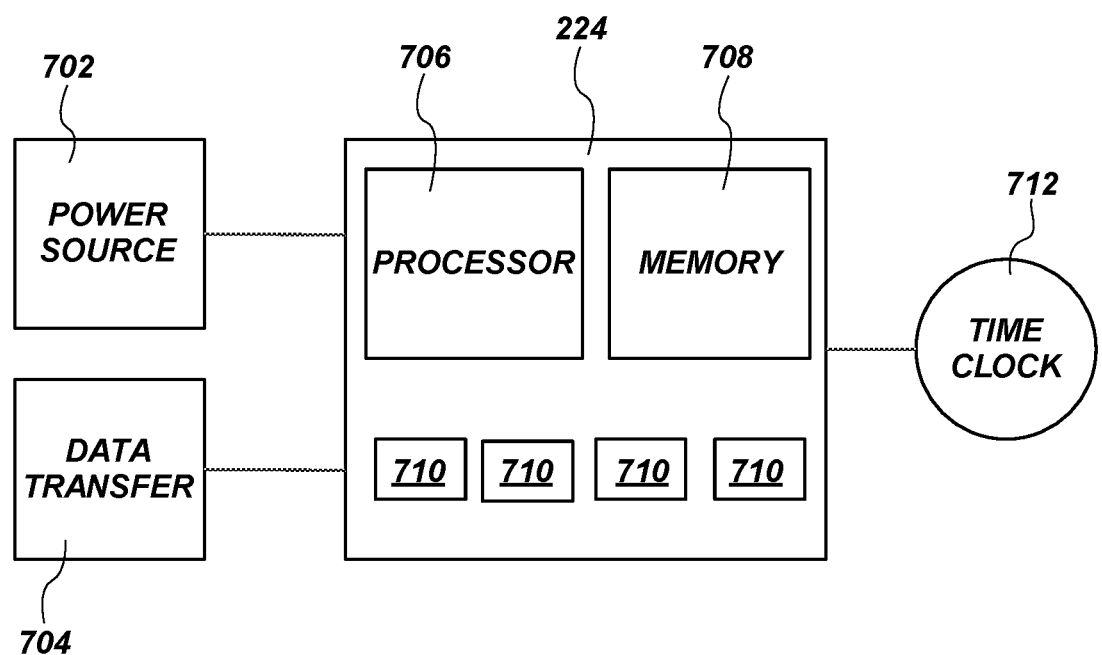
FIG. 7 illustrates a schematic view of a sensor assembly in accordance with an embodiment of the present disclosure.

FIG. 7 illustrates a schematic view of the sensor board 224 and associated components. The sensor board 224 may include a processor 706 and a memory storage device 708. The memory storage device 708 may be configured to store instructions for the processor 706. In some embodiments, the memory storage device 708 may be configured to store readings from sensors 710 coupled to the sensor board 224.

In some embodiments, the processor 706 may be configured to control features of the sensor board 224, such as sampling rates, starting and/or stopping data recording; transmitting and/or receiving data and or instructions, etc. For example, the processor 706 may start recording data once the processor 706 determines that the sensor board 224 and the associated downhole tool 202, 402 are downhole. The processor 706 may periodically collect data from one or more sensors 710 of the sensor board 224. When the sensors 710 return values that coincide with downhole conditions, the processor 706 may determine that the sensor board 224 and the associated downhole tool 202, 402 are downhole and begin recording data from the sensors 710.

In some embodiments, the processor 706 may be configured to perform calculations with the raw sensor data provided by the sensors 710. For example, the processor may collect data from one or more accelerometers and determine operational parameters of the downhole tool 202, 402, such as rotational speed, bit direction, tilt, azimuth, etc., as described in, for example, U.S. patent application Ser. No. 16/945,471, filed on Jul. 31, 2020, and titled "SENSOR ARRANGEMENTS AND ASSOCIATED METHODS AND SYSTEMS," the disclosure of which was previously incorporated herein by reference. In some embodiments, the processor 706 may calculate downhole properties and/or tool properties from sensors configured to measure mechanical properties of the sensor structure 600, such as sensor 610 described above. In some embodiments, the processor 706 may control transfer and storage of the raw sensor data such as organizing the raw sensor data into arrays, data bases, etc., in a manner to provide the raw sensor data to a separate processor and/or computing device for performing the calculations and conversions.

The sensor board 224 may be coupled to a power source 702, such as a battery 304 or battery pack 410. The power source 702 may be configured to power the sensor board 224, the processor 706, the sensors 710, and/or any other components coupled directly or indirectly to the sensor board 224. In some embodiments, the power source 702 may be an external power source, such that the power source 702 is not directly attached to the sensor board 224. For example, the power source 702 may be located in the cap 206, 406 as described above, and electrically coupled to the sensor board 224 through wiring. In some embodiments, the power source 702 may be directly coupled to the sensor board 224. For example, the power source 702 may be a component directly soldered to the sensor board 224. In some embodiments, the sensor board 224 may include a battery receptacle directly coupled to the sensor board 224. The battery receptacle may be configured to receive a battery, such as a button cell battery, to act as the power source 702.

The sensor board 224 may be coupled to a data transfer device 704, such as a data port 208, transmitter, receiver, etc., as described above. The data transfer device 704 may be configured to transfer data from and/or to the sensor board 224. For example, the data transfer device 704 may be configured to transfer sensor data from the sensor board 224 to another component of the drill string or downhole tool 202, 402. In some embodiments, the data transfer device 704 may be configured to transfer sensor data to a computing device separate from the drill string. In some embodiments, the data transfer device 704 may be configured to receive sensor data from another component of the drill string or downhole tool 202, 402. In some embodiments, the data transfer device 704 may be configured to receive data from an external computer, such as set-up data, firmware updates, programming updates, sensor configurations, etc.

In some embodiments, the data transfer device 704 may be an external device configured to couple to the sensor board 224 through a wired or terminal connection. For example, as described above with respect to FIGS. 2 and 3, the data port 208 may be coupled to the sensor board 224 through the cap 206, 406. In some embodiments, the data transfer device 704 may be coupled directly to the sensor board 224. For example, the data transfer device 704 may be a transmitter and/or receiver positioned on the sensor board 224. The transmitter and/or receiver may be configured to transmit and/or receive signals, such as radio frequency signals, through the cap 206, 406. For example, the cap 206, 406 a radio frequency transparent portion (e.g., the communication feature 418, an RF transparent cap, an RF window, etc.), as described above with respect to FIGS. 2 and 4.

The sensor board 224 may include a timing device 712, such as a time clock. In some embodiments, the timing device 712 may be configured to provide triggers to the processor 706. The processor 706 may be configured to execute specific commands on different triggers. For example, before the processor 706 has begun recording data, the processor 706 may be configured to monitor specific sensors 710 at longer time intervals to determine if the sensor board 224 and the associated downhole tool 202, 402 is downhole. The longer time intervals may be provided by a trigger from the timing device 712. In some embodiments, when the processor 706 is recording data, some sensor measurements may need to be coordinated. For example, some sensor measurements may need to be measured at substantially the same time to facilitate calculations using sensor measurements from more than one sensor 710. The timing device 712 may provide a trigger to the processor 706 such that the measurements may be taken from each of the associated sensors 710 when the trigger from the timing device 712 is received by the processor 706.

In some embodiments, the timing device 712 may be directly coupled to the sensor board 224. For example, the timing device 712 may be a component soldered directly to the sensor board 224. In some embodiments, the timing device 712 may be a remote device electrically coupled to the sensor board 224 through wiring or terminals. In some embodiments, the timing device 712 may be integrated into the processor 706 (e.g., embedded in the processor 706).

Figure 8:
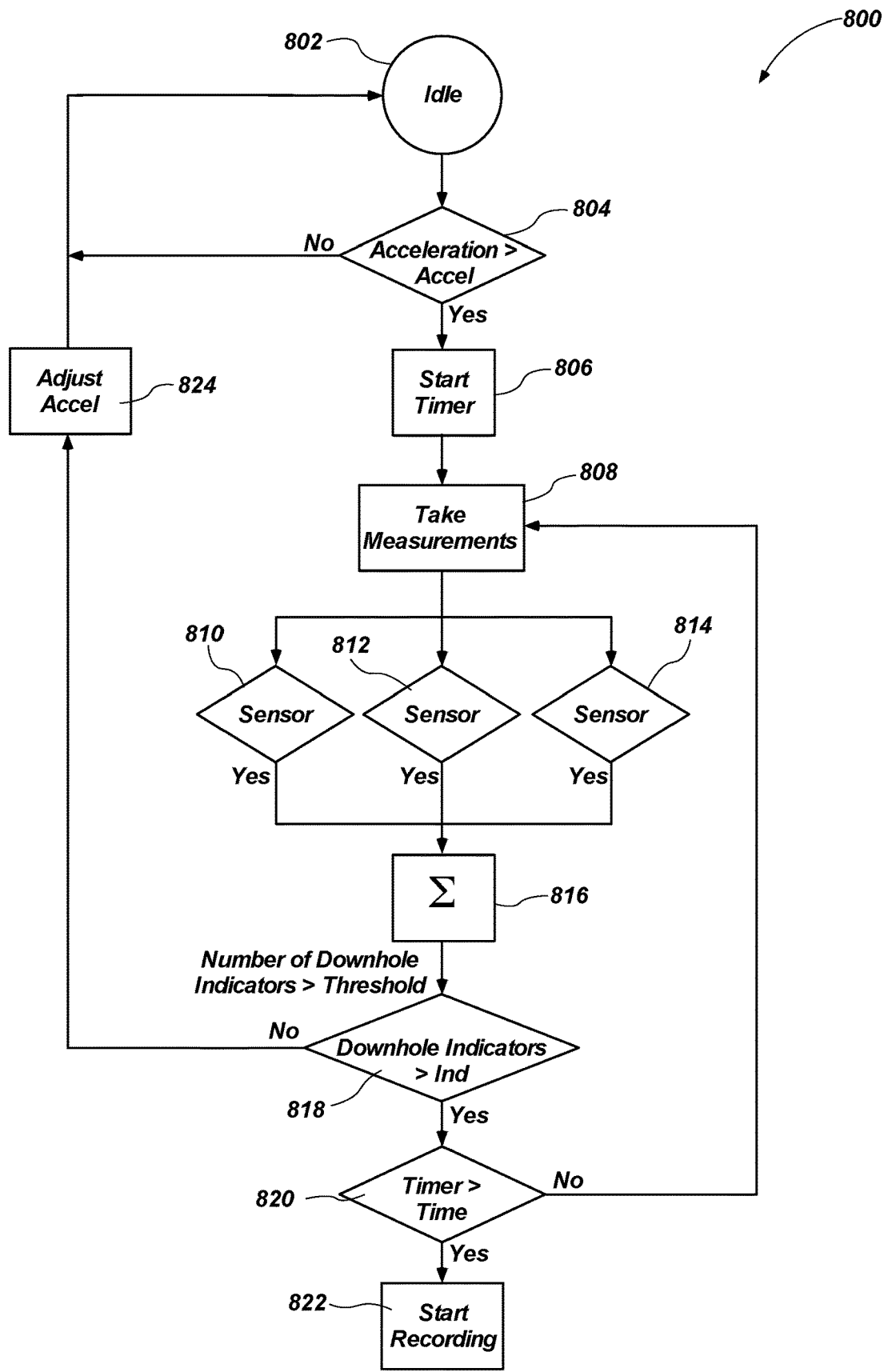
FIG. 8 illustrates a flow diagram of a control sequence of a sensor assembly in accordance with an embodiment of the present disclosure.

FIG. 8 illustrates a startup sequence 800 for the sensor board 224. The startup sequence 800 may be configured to enable the sensor board 224 to conserve power when the sensor board 224 is not in an area of interest, such as downhole. For example, the startup sequence 800 may substantially prevent the sensor board 224 from data logging and capturing significant amounts of data when the sensor board 224 and the associated self-contained sensor assembly 200, 400 and downhole tool 202, 402 are in storage, in transit to a drilling site, and/or being coupled to a drill string. Conserving power may enable the sensor board 224 to include a smaller power source 702 and/or extend a service life of the self-contained sensor assembly 200, 400.

The sensor board 224 may be maintained in an idle mode, as illustrated in act 802. In the idle mode, the processor 706 may operate in a sleep or low power mode. In the sleep or low power mode, the processor 706 may only monitor a small number of the sensors 710 of the sensor board 224 and may not perform any calculations with the sensor data from the sensors 710. When one or more of the accelerometers on the sensor board 224 detect movement of the self-contained sensor assembly 200, 400, a trigger may begin a start-up sequence in the processor 706 in act 804. In some embodiments, the one or more accelerometers may begin the start-up sequence through a switch. For example, the when the accelerometers detect movement of the self-contained sensor assembly 200, the accelerometer may engage a switch, such as a relay, limit switch, etc., that may switch based on the output of the accelerometer without processing the output of the accelerometer. The switch may then begin the start-up sequence of the processor 706. In some embodiments, other types of sensors may trigger the start-up sequence. For example, a pressure sensor, temperature sensor, gyroscope, gyrometer, magnetometer, etc., may be used to trigger the start-up sequence.

The trigger may start the timing device 712 in act 806. The timing device 712 may be configured to provide a trigger to the processor 706 at a time interval. In some embodiments, the time interval may be between about 15 seconds and about 1 hour, such as between about 1 minute and about 30 minutes or about 15 minutes.

The trigger from the timing device 712 may cause the processor 706 to take measurements from one or more sensors 710 in act 808. The measurements may correspond to features that are determined to indicate whether the self-contained sensor assembly 200, 400 and associated downhole tool 202, 402 are located downhole. For example, the sensors 710 may include temperature sensors, pressure sensors, accelerometers, gyroscopes, gyrometers, magnetometers, etc. In some embodiments, the processor 706 may be configured to take measurements from between about one sensor 710 and about ten sensors 710, such as between about two sensors 710 and about five sensors 710, or about three sensors 710.

Once the processor 706 takes the measurements from the one or more sensors 710 in act 808, the processor 706 may calculate one or more downhole indicators from the measurements in acts 810, 812, and 814. For example, the processor 706 may calculate a rotational speed in act 810, a temperature in act 812, and a pressure in act 814. In some embodiments, the processor 706 may calculate other downhole indicators, such as a standard deviation of acceleration, a standard deviation of rotational velocity, an acceleration pattern, a vibration, an inclination, azimuth, etc. The processor 706 may calculate between about one downhole indicator and about ten downhole indicators, such as between about two downhole indicators and about four downhole indicators, or about three downhole indicators.

The processor 706 may determine which of the downhole indicators calculated in acts 810, 812, and 814 are above associated threshold values in act 816. The threshold values for each of the downhole indicators may be values that are expected in a downhole environment that are not common values outside of a downhole environment. The processor 706 may add the number of downhole indicators that exceed the threshold values.

The processor 706 may then compare the number of downhole indicators that exceed the threshold values to the total number of downhole indicators calculated in act 818. If the number of downhole indicators that exceed the threshold values is less than the number of calculated downhole indicators, the accelerometer trigger may be reset in act 824 and the processor may return to the idle mode in act 802. In some instances, one or more of the downhole indicators may be above the threshold values while other values are not. For example, if the downhole tool 202, 402 is left in the sun the temperature measurement may be above the threshold value while a pressure measurement may remain below the threshold value and the rotational speed may be substantially zero.

If all of the calculated downhole indicators exceed the threshold values, the measurements may be retaken at act 820 for a threshold amount of time. The threshold amount of time may be between about 10 seconds and about 1 minute, such as about 30 seconds. If one or more of the calculated downhole indicators drop below the threshold values during the threshold amount of time, the accelerometer trigger may be reset in act 824 and the processor may return to the idle mode in act 802. If all of the calculated downhole indicators exceed the threshold values for the threshold amount of time, the processor 706 may begin operating in a normal operating condition and begin recording sensor values in act 822.

In some embodiments, different weights may be applied to different downhole indicators. For example, some downhole indicators, such as rotational speed or pressure may be less likely to exceed the threshold values when the downhole tool is not located downhole. In some embodiments, if a higher weighted downhole indicator(s) exceed the threshold value the measurements may be retaken at act 820 for the threshold amount of time. If the higher weighted downhole indicator(s) drop below the threshold value during the threshold amount of time, the accelerometer trigger may be reset in act 824 and the processor may return to the idle mode in act 802. If the higher weighted downhole indicator(s) exceed the threshold value for the threshold amount of time, the processor 706 may begin operating in a normal operating condition and begin recording sensor values in act 822.

Embodiments of the present disclosure may enable data to be captured from electrically isolated sensor structures installed on downhole tools without removing the sensor structures from the downhole tools. Not removing the sensor structures may enable the data stored in the sensor structures to be accessed faster, which may allow operational decisions to be made earlier. Earlier decisions may increase productivity of a wellbore and/or reduce the number of materials and man-hours associated with the borehole. Not removing the sensor structures, may also reduce the risk of damaging the sensor structure during disassembly and reassembly. This may enable the sensor structures to be reused reducing the costs associated with replacement parts.

Embodiments of the present disclosure may extend the service life of the electrically isolated sensor structures. Reducing power usage of the sensor structures, may enable the sensor structures to be used on more trips downhole. Reducing power usage may also allow for the use of smaller power sources, reducing the cost and size of the sensor structures.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A downhole sensor apparatus comprising:
    a structure carrying a circuit board, the structure configured to be inserted into a recess in a tool on a drill string;
    one or more sensors coupled to the circuit board;
    a cap over the structure, the cap secured to the tool and configured to be exposed to an environment around the tool;
    a data port disposed through the cap, the data port electrically coupled to the circuit board and configured to transmit data from the one or more sensors to an external device, without removing the cap from the tool;
    a removable plug disposed through the cap over the data port, wherein the plug is configured to block access to the data port and to protect the data port from the environment around the tool when installed and the cap is configured to provide access to the data port when the removable plug is removed; and a securing element configured to engage a complementary feature in the recess in the tool, the securing element configured to secure the structure to the tool.

2. The downhole sensor apparatus of claim 1, wherein the cap comprises the securing element.

3. The downhole sensor apparatus of claim 1, wherein the cap comprises a ridge proximate a base of the cap.

4. The downhole sensor apparatus of claim 3, wherein the securing element comprises a locking ring separate from the structure and the cap, wherein the locking ring is configured to contact the ridge of the cap and secure the cap and the structure to the tool.

5. The downhole sensor apparatus of claim 1, wherein the structure comprises a keying feature configured to secure the structure and the circuit board in a specific orientation relative to the tool.

6. The downhole sensor apparatus of claim 1, wherein the data port comprises a connector configured to receive an external wired connection.

7. The downhole sensor apparatus of claim 1, wherein the data port comprises a wireless transmitter configured to transmit the data wirelessly to the external device.

8. The downhole sensor apparatus of claim 1, wherein the cap comprises an aperture extending through the cap.

9. The downhole sensor apparatus of claim 8, wherein the data port is disposed in the aperture through the cap.

10. An earth-boring tool comprising:
a recess in the earth-boring tool;
the downhole sensor apparatus of claim 1 disposed in the recess in the earth-boring tool;
wherein the structure is positioned between the cap and the earth-boring tool; and
a securing element configured to secure the cap to the earth-boring tool, the securing element comprising a ring configured to engage complementary features in the recess of the earth-boring tool and a ridge extending from the cap.

11. The earth-boring tool of claim 10, further comprising a data transfer device electrically coupled to the circuit board, the data transfer device configured to transmit data from the one or more sensors to an external device, wherein the data transfer device comprises a wireless transmitter.

12. The earth-boring tool of claim 11, wherein the cap comprises a radio frequency transparent material.

13. The earth-boring tool of claim 10, further comprising a data transfer device electrically coupled to the circuit board, the data transfer device configured to transmit data from the one or more sensors to an external device, wherein the data transfer device comprises a data port configured to receive a wired connector.

14. The earth-boring tool of claim 13, wherein the data transfer device is disposed in the cap.

15. The earth-boring tool of claim 10, further comprising a sensor coupled to the structure configured to measure one or more mechanical properties of the structure.

16. A method of controlling a sensor apparatus on a downhole tool, the method comprising:
operating the sensor apparatus in an idle condition;
capturing readings from at least one sensor at a time interval;
comparing the readings from the at least one sensor to threshold downhole conditions; and
when the readings from the at least one sensor meets or exceeds the threshold downhole conditions, activating a start-up sequence;
monitoring at least one additional sensor during the start-up sequence;
when the at least one additional sensor meets or exceeds an additional threshold downhole condition, beginning a normal operating condition of the sensor apparatus.

17. The method of claim 16, wherein at least one of the readings comprises a rotational speed reading.

18. The method of claim 16, wherein the at least one sensor comprises at least three sensors.

19. The method of claim 16, wherein at least one of the readings comprises a calculated downhole condition.

20. The method of claim 16, further comprising:
detecting an acceleration from an accelerometer;
starting a timer after detecting the acceleration; and
capturing the readings from the at least one sensor at the time interval after starting the timer.

* * * * *